United States Patent [19]

Ogata

[11] Patent Number: 5,283,283
[45] Date of Patent: Feb. 1, 1994

[54] HIGH MODULUS BLEND OF POLY(α-AMINO ACID) IN RUBBERY ELASTOMER

[75] Inventor: Naoya Ogata, Tokyo, Japan

[73] Assignee: The Goodyear Tire & Rubber Company, Akron, Ohio

[21] Appl. No.: 739,552

[22] Filed: Aug. 2, 1991

[51] Int. Cl.⁵ .............................................. C08L 77/02
[52] U.S. Cl. .................................... 525/66; 525/183; 525/184
[58] Field of Search ................... 525/184, 183, 66

[56] References Cited

U.S. PATENT DOCUMENTS

| | | | |
|---|---|---|---|
| 3,582,397 | 6/1971 | Shibata et al. | 39/637 |
| 3,914,479 | 10/1975 | Yamagata et al. | 427/390 |
| 4,501,867 | 2/1985 | Ueno et al. | 526/136 |
| 4,686,262 | 8/1987 | Binsack et al. | 525/177 |
| 4,694,042 | 9/1987 | McKee et al. | 525/66 |
| 4,708,987 | 11/1987 | Hergenrother et al. | 525/184 |

*Primary Examiner*—Ana L. Carrillo
*Attorney, Agent, or Firm*—Alvin T. Rockhill

[57] ABSTRACT

It is frequently desirable to increase the modulus of rubbers which are utilized in a wide variety of applications. This invention discloses a technique for increasing the modulus of rubbers. By utilizing this technique, high modulus rubber compositions can be attained without sacrificing other properties, such as elongation and hysteresis. This invention more specifically relates to a process for preparing a high modulus rubber composition which comprises: (1) polymerizing at least one N-carboxyl-α-amino acid anhydride in a polymer cement of a rubbery elastomer under conditions which result in the formation of a rubber cement having the poly(α-amino acid) dispersed therein; and (2) recovering the high modulus rubber composition from the rubber cement. The high modulus rubber compositions made by this technique are comprised of at least one rubbery elastomer and at least one poly(α-amino acid).

13 Claims, No Drawings

HIGH MODULUS BLEND OF POLY(α-AMINO ACID) IN RUBBERY ELASTOMER

BACKGROUND OF THE INVENTION

It is sometimes desirable to increase the modulus of rubber compounds. For instance, it is generally desirable to increase the modulus of rubber compounds which are utilized in tire tread base compositions and in tire wire coat compounds. A higher degree of stiffness in such rubber compositions is conventionally attained by incorporating larger amounts of fillers, such as carbon black, into the rubber compounds and/or by increasing the state of cure of such compounds. Unfortunately, both of these techniques generally lead to undesirable results. For instance, the incorporation of additional carbon black into rubber compounds typically leads to high levels of hysteresis. Accordingly, the utilization of such compounds in tires results in excessive heat buildup and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not usually possible to attain the desired degree of stiffness in tire tread base compounds by simply adding higher levels of fillers or curatives.

It is also known that the modulus of rubbers can be increased by blending various rigid polymers therein. For instance, polyesters can be blended into rubbers to increase the modulus of the rubber. However, such rubber/polyester blends typically display elongations which are greatly reduced. In other words, such standard blending techniques can be utilized to increase the modulus of rubbers but such techniques are very detrimental with respect to elongation.

SUMMARY OF THE INVENTION

The subject invention discloses a technique for modifying a rubber so as to greatly increase its modulus. This results in the rubber being better suited for applications where a high degree of stiffness is desired. However, this modification procedure does not generally sacrifice other desirable characteristics of the rubber. For instance, the rubber compositions of this invention have an increase modulus while maintaining an outstanding degree of elongation. Additionally, the rubber compositions of this invention do not exhibit a significantly increased degree of hysteresis.

This invention specifically discloses a high modulus rubber composition which is comprised of (a) from about 70 weight percent to about 99.9 weight percent of at least one rubbery elastomer, and (b) from about 0.1 weight percent to about 30 weight percent of at least one poly(α-amino acid).

The subject invention also reveals a process for preparing a high modulus rubber composition which comprises: (1) polymerizing at least one N-carboxyl-α-amino acid anhydride in a polymer cement of a rubbery elastomer under conditions which result in the formation of a rubber cement having the poly(α-amino acid) dispersed therein; with the proviso that if any of the N-carboxyl-α-amino acid anhydrides are L-stereoisomers that all of the N-carboxyl-α-amino acid anhydrides are L-stereoisomers; and with the proviso that if any of the N-carboxyl-α-amino acid anhydrides are D-stereoisomers that all of the N-carboxyl-α-amino acid anhydrides are D-stereoisomers; and (2) recovering the high modulus rubber composition from the rubber cement.

DETAILED DESCRIPTION OF THE INVENTION

Virtually any type of rubbery elastomer can be utilized in preparing the high modulus rubber composition of this invention. The rubbers which are modified in accordance with this invention typically contain repeat units which are derived from diene monomers, such as conjugated diene monomers and/or nonconjugated diene monomers. Such conjugated and nonconjugated diene monomers typically contain from 4 to about 12 carbon atoms and preferably contain from 4 to about 8 carbon atoms. Some representative examples of suitable diene monomers include 1,3-butadiene, isoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The polydiene rubber can also contain various vinyl aromatic monomers, such as styrene, 1-vinylnaphthalene, 2-vinylnaphthalene, α-methylstyrene, 4-phenylstyrene, 3-methylstyrene, and the like. Some representative examples of polydiene rubbers that can be modified by utilizing the procedure of this invention include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber, and EPDM rubber. The technique of this invention is particularly well suited for utilization in modifying natural rubber, synthetic polyisoprene, and cis-1,4-polybutadiene.

The rubbery elastomers utilized in the high modulus rubber compositions of this invention can be made by solution polymerization, emulsion polymerization, or bulk polymerization. It is, of course, also possible to use natural rubber in preparing the rubber compositions of this invention. It is preferred for the rubber to be made by solution polymerization. In cases where solution polymerization is employed, it is not necessary to recover the rubber from the organic solvent in which it is dissolved. In other words, the rubber cement can be use in the process of this invention without first recovering the rubber in dry form. By doing so, the unnecessary steps of removing the rubber from the organic solvent and redissolving it are eliminated. It is, of course, also possible to dissolve natural rubber or a rubber prepared by emulsion polymerization or bulk polymerization in an organic solvent so as to prepare a rubber cement which can be utilized in accordance with this invention.

The high modulus rubber compositions of this invention are prepared by synthesizing a poly(α-amino acid) in the polymer cement of a rubbery elastomer. The poly(α-amino acid) is prepared by polymerizing at least one N-carboxy-α-amino acid anhydride (α-amino acid NCA) in the rubber cement (rubber solution). Such polymerizations result in the formation of a highly dispersed blend of the poly(α-amino acid) within the rubber cement. The organic solvent in the rubber cement serves as the solvent for the N-carboxyl-α-amino acid anhydride monomer being polymerized as well as the solvent for the rubber. Essentially homogeneous solutions of the poly(α-amino acid) and the rubbery elastomer in the organic solvent result from such polymerizations.

Because the rubber cement containing the poly(α-amino acid) is essentially homogeneous in nature, highly dispersed blends of the poly(α-amino acid) in the rubbery elastomer can be recovered in dry form from the organic solvent. In other words highly dispersed dry blends of the poly(α-amino acid) in the rubber can be prepared utilizing the technique of this invention. The organic solvent can be removed utilizing conventional techniques such as coagulation or evaporation to recover such highly dispersed blends which are high modulus rubber compositions.

The polymer cement can be prepared by polymerizing one or more diene monomers in a suitable inert organic solvent. The organic solvent utilized will normally be a saturated aliphatic hydrocarbon or an aromatic hydrocarbon. Some representative examples of suitable aromatic solvents include benzene, toluene, xylene, ethylbenzene, diethylbenzene, isobutylbenzene, and the like. Some representative examples of suitable aliphatic solvents include n-pentane, n-hexane, cyclohexane, methylcyclohexane, isohexane, n-heptane, isoheptane, n-octane, isooctane, n-nonane, isononane, n-detane, isodetane, n-undecane, n-dodecane, 2,2-dimethylbutane, petroleum ether, kerosene, petroleum spirits, petroleum naphtha and the like. It is normally desirable to select an inert organic solvent which is a liquid under the conditions at which the rubber cement will be handled.

The rubber cement can be prepared by polymerizing one or more diene monomers in the organic solvent. As has been explained, vinyl-substituted aromatic monomers can also be copolymerized with the diene monomers into suitable rubbery elastomers, such as SBR. Such polydiene rubbers can be synthesized utilizing standard solution polymerization techniques. For instance, high cis-1,4-polybutadiene rubber can be prepared utilizing a catalyst system which contains (a) an organoaluminum compound, (b) an organonickel compound and (c) a fluorine containing compound in accordance with the procedures disclosed in U.S. Pat. No. 3,856,764 and U.S. Pat. No. 3,985,677. Polybutadiene rubber can also be prepared under solution polymerization conditions utilizing rare earth catalyst systems, such as lanthanide systems, which are normally considered to be "pseudo-living". Such rare earth catalyst systems are comprised of three components. These components include (a) an organoaluminum compound, (b) an organometallic compound which contains a metal from Group III-B of the periodic system and (c) at least one compound which contains one labile halide ion. The synthesis of polybutadiene utilizing such a rare earth catalyst system is described in greater detail in U.S. Pat. No. 4,663,405. Metals from Group I and II of the periodic system can also be utilized as catalysts for the solution polymerization of diene monomers into useful rubbers. The utilization of Group I and Group II metals as initiators results in the formation of "living" polymers. The metals which are most commonly utilized in initiator systems of this type include barium, lithium, magnesium, sodium and potassium. Lithium and magnesium are the metals that are most commonly utilized in such initiator systems with lithium generally being most preferred. As a general rule, it is highly preferred to utilize organolithium compounds having the structural formula: Li—R, wherein R represents an alkyl group containing from 1 to 20 carbon atoms. More commonly the alkyl group in such alkyl lithium compounds will contain from 2 to 8 carbon compounds with compounds such as n-butyllithium being widely used.

It is possible to prepare rubber cements utilizing catalyst systems other than those described herein. Virtually any type of rubber cement can be utilized in practicing this invention. However, it is important to select a rubber which does not contain reactive functional groups which will react with the α-amino acid NCA. Thus, rubbers containing amino groups, hydroxyl groups, carboxyl groups or any other functional groups containing active hydrogen atoms should be avoided. However, it is possible to block such functional groups to render them unreactive with the α-amino acid NCA. For instance, the carboxyl group on a carboxylated nitrile rubber can be esterified so as to render them unreactive and accordingly makes them suitable for utilization in the process of this invention.

The high modulus rubber compositions of this invention are synthesized by adding at least one α-amino acid NCA and an initiator to a rubber cement. The amount of monomer added will depend upon the desired level of incorporation of the poly(α-amino acid) into the highly dispersed blend being prepared. Typically an amount of monomer sufficient to prepare a blend containing about 0.1 weight percent to about 30 weight percent of the poly(α-amino acid), based upon the total weight of the blend, will be utilized. It is typically preferred for the highly dispersed blend to contain from about 1 weight percent to about 10 weight percent poly(α-amino acid) and from about 90 weight percent to about 99 weight percent rubber. It is generally most preferred for the blend to contain from about 3 weight percent to about 7 weight percent poly(α-amino acid) and from about 93 weight percent to about 97 weight percent rubber.

The solution of α-amino acid NCAs in the rubber cement will normally contain from about 5 weight percent to about 35 weight percent monomers and polymers, based upon the total weight of the polymerization medium (monomers, rubber, and solvent). The polymerization medium will preferably contain from about 10 weight percent to about 30 weight percent monomers and polymers. It will generally be more preferred for the polymerization medium to contain from about 15 weight to about 25 weight percent monomers and polymers. In commercial operations, the polymerization medium will typically contain about 18 weight percent to about 22 weight percent monomers and polymers.

The α-amino acid NCAs which are utilized in practicing this invention are of the general structural formula:

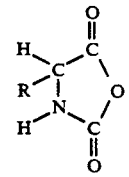

wherein R represents a hydrogen atom or an organic moiety. R will typically be an alkyl group or a branched alkyl group which contains from 1 to about 12 carbon atoms. In most cases R is an alkyl group or a branched alkyl group which contains from 1 to about 6 carbon atoms. R can also represent an aromatic group or a heterocyclic group. Some representative examples of α-amino acid NCAs which can be employed include N-carboxyl-alanine anydride, N-carboxyl-valine anhydride, N-carboxyl-leucine anhydride, N-carboxyl-isoleucine anhydride, N-carboxyl-phenylalanine anhydride, N-carboxyl glycine anhydride, N-carboxyl-glutamate anhydride, N-carboxyl-aspartate anhydride, and the like. α-amino acid NCAs can be prepared by reacting an amino acid with phosgene utilizing dioxan as the solvent. This reaction can be depicted as follows:

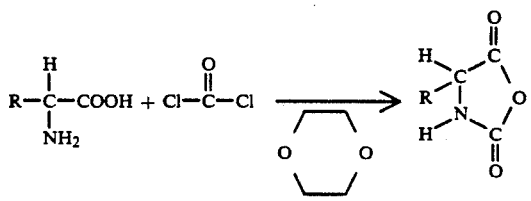

Utilizing this reaction, any α-amino acid can be converted to its corresponding α-amino acid NCA. Some representative examples of suitable amino acids include alanine, valine, leucine, isoleucine, phenylalanine and glycine. Amino acids containing hydroxyl groups such as serine, threonine, and tyrosine, can also be utilized. However, it is necessary to block the hydroxyl group on the resultant monomers before polymerization is initiated. Aspartic acid and glutamic acid can also be converted into useful α-amino acid NCAs. However, the carboxyl groups on these compounds should be blocked before polymerization is initiated. As has been explained, this can be done by esterifying the carboxyl group with an alcohol.

Polymerization is initiated by adding ammonia, an amine, or lithium chloride to the polymerization medium which contains the α-amino acid NCA and the rubber. The polymerization will normally be conducted at a temperature which is within the range of about 0° C. to about 100° C. It is generally preferred to conduct the polymerization at a temperature which is within the range of about 10° C. to about 60° C. with it being most preferred to conducted the polymerization at a temperature which is within the range of about 15° C. to about 30° C. The molecular weight of the poly(α-amino acid) produced is inversely proportional to the amount of initiator added. As a general rule, the molar ratio monomer to initiator will be within the range of about 15:1 to about 1000:1. It is normally preferred for the molar ratio of monomer to initiator to be within the range of about 60:1 to about 600:1. It is typically more preferred for the molar ratio of monomer to initiator to be within the range of about 100:1 to about 300:1. In most cases, a primary amine of the structural formula R—NH$_2$, wherein R is an alkyl group containing from 1 to 10 carbon atoms will be utilized as the initiator.

The polymerization reaction which occurs results in the formation of a polypeptide which assumes the α-helix configuration. The formation of the α-helix is spontaneous because it is the stablest, possible configuration and has the least free energy. The α-helix configuration allows for maximization of hydrogen bonding. The α-helix is a rigid structure which enhances the mechanical properties of the poly(α-amino acid)/rubber blend. This α-helix structure causes the poly(α-amino acid) to be liquid crystalline in nature.

All amino acids, with the exception of glycine, and their corresponding α-amino acid NCAs exist in the form of two enantiomers. This is because the α-carbon atom in these compounds is asymmetric in nature. Thus, there are L and D stereoisomers for all α-amino acid NCAs with the exception of N-carboxyl-glycine anhydride. To form an α-helix it is essential for all of the α-amino acid NCAs used in the synthesis of the poly(α-amino acid) to be of the same absolute configuration with respect to the α-carbon atom therein. In other words, racemates cannot be used. All of the α-amino acid NCAs can be D-stereoisomers, or in the alternative, all of the α-amino acid NCAs can be L-stereoisomers. However, racemates which contain both D-stereoisomers and L-stereoisomers cannot be used. A peptide chain containing a mixture of L-stereoisomers and D-stereoisomers will not form an α-helix. The utilization of L-stereoisomers of α-amino acid NCAs is preferred because their use results in the formation of right-handed α-helical coils which are significantly more stable than left-handed α-helical coils.

This invention is illustrated by the following working examples which are presented merely for the purpose of illustration and are not to be regarded as limiting the scope of the invention or the manner in which it can be practiced. Unless specifically indicated otherwise, parts and percentages are given by weight.

EXAMPLES 1-4

In this series of experiments, highly dispersed blends of a poly(α-amino acid) in SBR were prepared. In the procedure utilized N-carboxyl-L-glutamate anhydride (L-glutamate NCA) was dissolved in a 15 weight percent solution of SBR in dichloroethane. The amount of L-glutamate NCA added in each experiment was sufficient to result in the amount of poly(L-glutamate) shown in Table I to be present in the blend produced. Polymerization was initiated by adding hexyl amine to the polymerization medium at a molar ratio of monomer to amine of 200:1. This resulted in the formation of poly(L-glutamate) which had a weight average molecular weight of 14,500.

The polymerizations were carried out at room temperature for about 1 hour. This reaction time of about 1 hour was sufficient for the polymerization to go to completion. Uniform blends of the poly(L-glutamate) in SBR were subsequently solution cast into films. These films were evaluate to determine Young's modulus, tensile strength, and elongation. The results of this stress-strain testing is reported in Table I.

TABLE I

| Example | % poly(L-glutamate) | Young's Modulus | Tensile Strength | Elongation |
|---|---|---|---|---|
| 1 | 0 | 384 MPa | 133 MPa | 952% |
| 2 | 5 | 731 MPa | 132 MPa | 873% |
| 3 | 10 | 646 MPa | 110 MPa | 784% |
| 4 | 15 | 633 MPa | 106 MPa | 759% |

Example 1 was done as a control. This series of experiments shows that the Young's modulus of SBR can be increased by 90% by incorporating 5 weight percent poly(L-glutamate) therein utilizing the procedure of this invention. In doing so, tensile strength is reduced by less than 1% with elongation being reduced by less than 10%. This dramatic increase in Young's modulus is believed to be due to the presence of very rigid chains of poly(L-glutamate) which are in the α-helix configuration. The presence of such poly(α-amino acids) unexpectedly reduces tensile strength to an insignificant degree while reducing elongation only slightly.

While certain representative embodiments and details have been shown for the purpose of illustrating the subject invention, it will be apparent to those skilled in this art that various changes and modifications can be made therein without departing from the scope of the subject invention.

What is claimed is:

1. A high modulus rubber composition which is comprised of (a) from 93 weight percent to 97 weight percent of at least one rubbery elastomer, and (b) from 3 weight percent to 7 weight percent of at least one poly(α-amino acid) wherein said poly(α-amino acid) is in an α-helical configuration.

2. A high modulus rubber composition as specified in claim 1 wherein the poly(α-amino acid) is selected from the group consisting of polyalanine, polyvaline, polyleucine, polyisoleucine, polyphenylalanine, polyglycine, polyglutamate, and polyaspartate.

3. A high modulus rubber composition as specified in claim 1 wherein the poly(α-amino acid) is polyglutamate.

4. A high modulus rubber composition as specified in claim 1 wherein the α-helical configuration is a right-handed α-helical configuration.

5. A high modulus rubber composition as specified in claim 3 wherein said rubbery elastomer is styrene-butadiene rubber.

6. A high modulus rubber composition as specified in claim 3 wherein said polyglutamate is in a right-handed α-helical configuration.

7. A high modulus rubber composition as specified in claim 3 wherein said rubbery elastomer is polybutadiene.

8. A high modulus rubber composition as specified in claim 3 wherein said rubbery elastomer is synthetic polyisoprene.

9. A high modulus rubber composition as specified in claim 3 wherein said rubbery elastomer is natural rubber.

10. A high modulus rubber composition as specified in claim 3 wherein said rubbery elastomer is isoprene-butadiene rubber.

11. A high modulus rubber composition as specified in claim 3 wherein said rubbery elastomer is isoprene-butadiene-styrene rubber.

12. A high modulus rubber composition as specified in claim 3 wherein said rubbery elastomer is nitrile rubber.

13. A high modulus rubber composition as specified in claim 3 wherein said rubbery elastomer is carboxylated nitrile rubber.

* * * * *